J. L. JENSEN.
BEET BLOCKING MACHINE.
APPLICATION FILED JAN. 25, 1916.
1,193,791.
Patented Aug. 8, 1916.
2 SHEETS—SHEET 1.
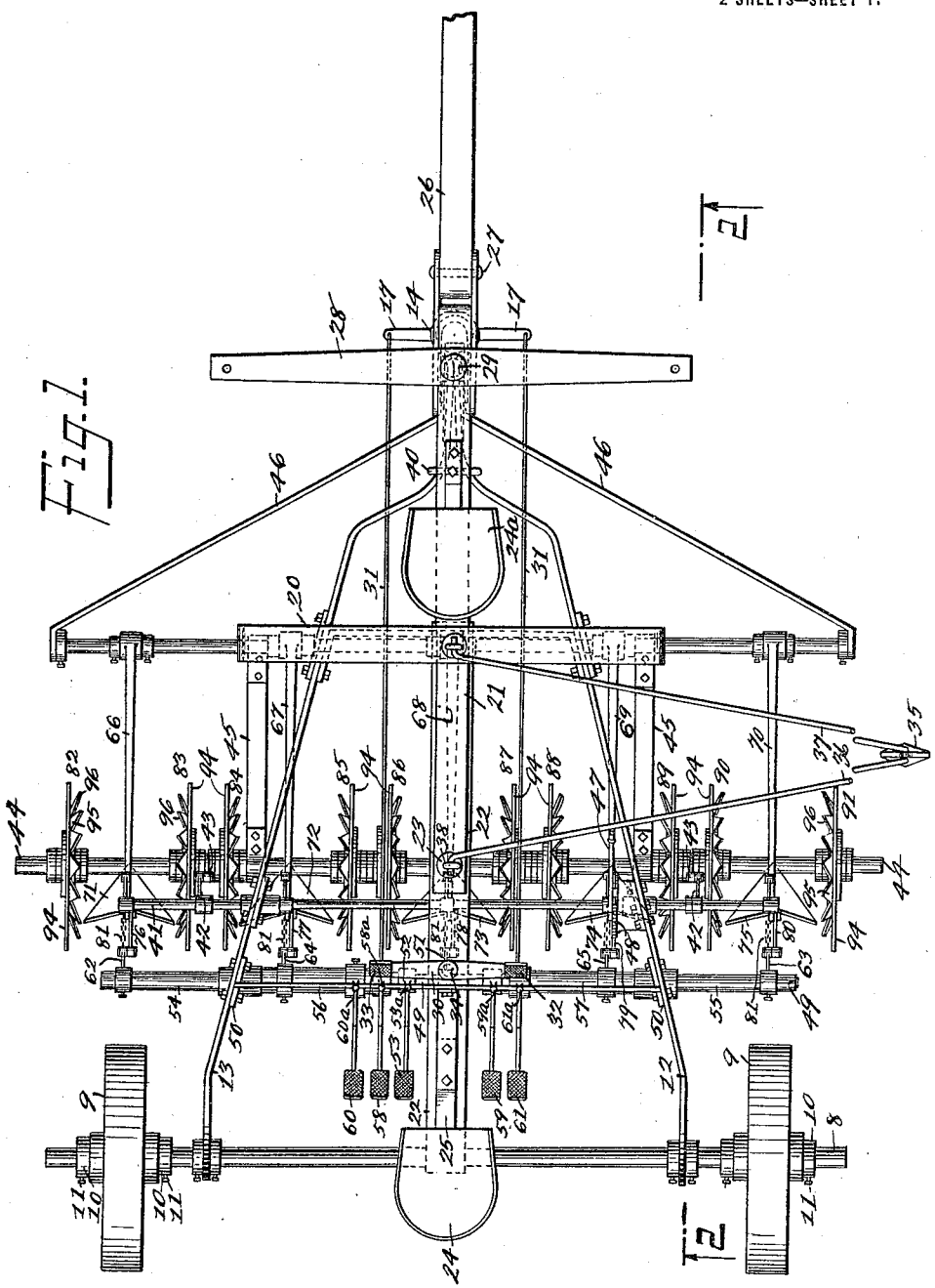
WITNESSES
George L. Blume.
J. E. Larsen.
INVENTOR
Joseph L. Jensen
BY Munn & Co.
ATTORNEYS J. L. JENSEN.
BEET BLOCKING MACHINE.
APPLICATION FILED JAN. 25, 1916.
1,193,791.
Patented Aug. 8, 1916.
2 SHEETS—SHEET 2.
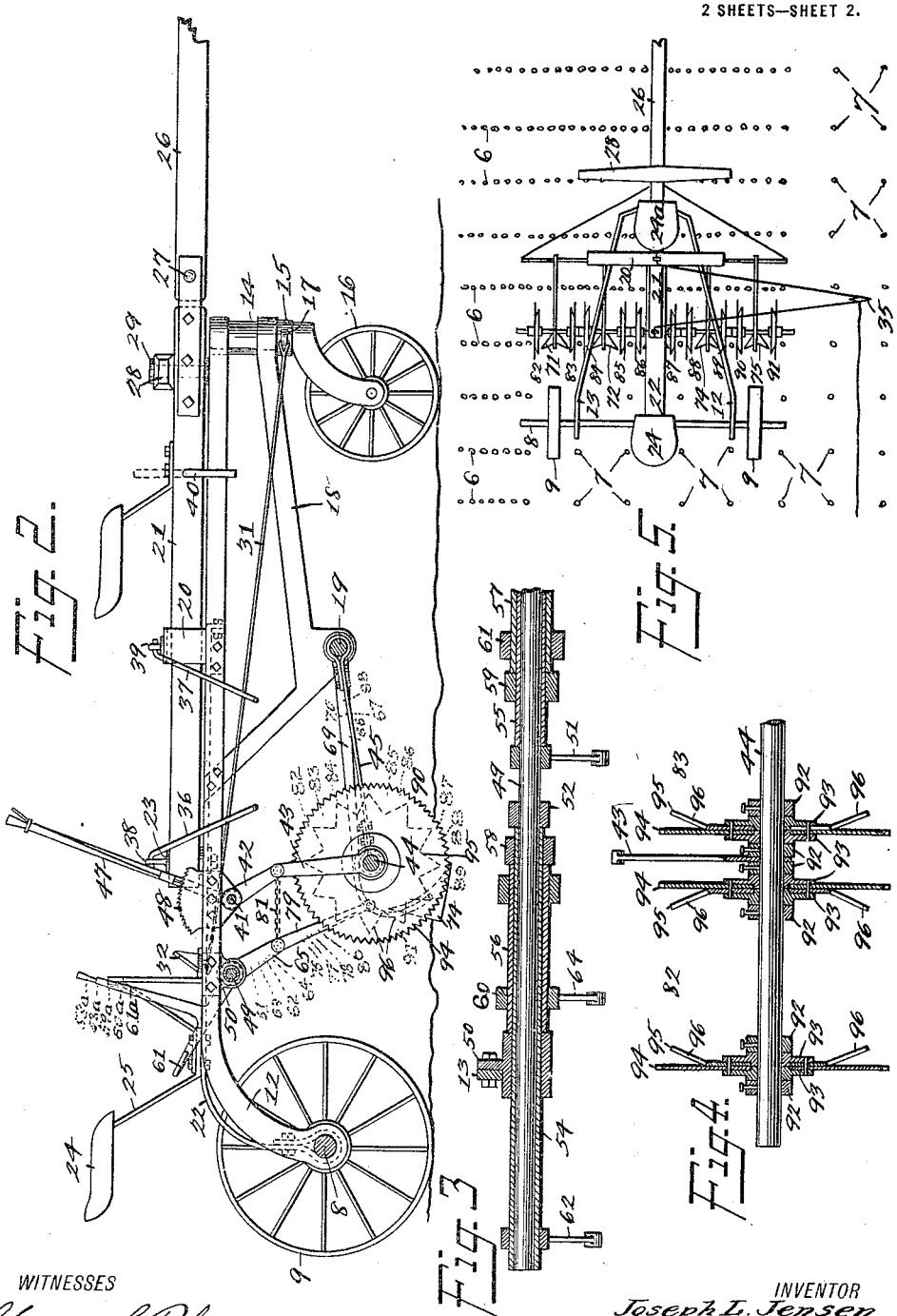
WITNESSES
George L. Blume.
J. C. Larsen
INVENTOR
Joseph L. Jensen
BY Munn & Co.
ATTORNEYS

UNITED STATES PATENT OFFICE.

JOSEPH LEWIS JENSEN, OF RICHFIELD, UTAH.

BEET-BLOCKING MACHINE.

1,193,791. Specification of Letters Patent. Patented Aug. 8, 1916.

Application filed January 25, 1916. Serial No. 74,242.

*To all whom it may concern:*

Be it known that I, JOSEPH L. JENSEN, a citizen of the United States, and a resident of Richfield, in the county of Sevier and State of Utah, have invented certain new and useful Improvements in Beet-Blocking Machines, of which the following is a specification.

My invention relates to the cultivation of sugar-beets, cotton, and other plants, and the main object thereof is to provide a machine adapted to be drawn or otherwise propelled transversely of the substantially parallel rows of plants in order to block out, thin, or cut away plants not wanted and to leave plants that are wanted.

A further object is to provide such a device which protects the plants which it is desired to retain from injury, but which cuts away vegetation of all kinds between said plants, in all of the parallel rows of plants traversed; and a further object is to provide such a device which may be actuated, in whole or in part, to clear or avoid plants in the event of their not being symmetrically arranged, but which it is desired to retain.

My invention is fully described in the following specification, of which the accompanying drawings form a part, in which the separate parts are designated by the same reference characters in each of the views, and in which:—

Figure 1 is a plan view of a present preferred form of my invention, adapted to be drawn by horses; Fig. 2 is a section taken on the line 2—2 of Fig. 1; Fig. 3 is a fragmentary, detached, view of a detail of the construction; Fig. 4 is a similar view of another detail; and Fig. 5 is a plan view of the manner of using the device.

My invention may be moved or propelled in any desired manner, by pulling or pushing, but, for purposes of description, I have illustrated a horse drawn machine which is adapted to be moved transversely of a series of substantially parallel rows 6, Fig. 5, to cut away all undesired plants of whatever kind or class growing between desired plants 7, thereby insuring a desired spacing of the desired plants, and a substantially symmetrical arrangement thereof, and it will be obvious that the device may be used in connection with any class of vegetation, in the early stages of the growth thereof.

In the form illustrated I have shown an axle 8 having traction wheels 9, which may be provided with cleats if desired, adjustable along said axle and held in adjusted position by means of collars 10 and bolts 11, or in any other manner, and said axle also supports a main frame of yoke form composed of two upwardly and forwardly directed side members 12 and 13 connected, at their forward ends, with a cylindrical head 14 in which is a rotatable spindle or swivel 15 carrying a wheel or roller 16 at its lower end, preferably offset, and said swivel is provided with outwardly directed, diametrically arranged, arms 17 whereby the machine may be guided in the manner hereinafter set forth, and I also connect the lower part of the head 14 with the frame members 12 and 13 by means of supplemental frame members 18 carrying a shaft or draw-bar 19.

The main frame members 12 and 13 also support a transverse, slotted, guide 20 for a sway-bar 21 extending forwardly beyond the head 14 and in pivotal connection with a centrally arranged, longitudinal, frame member 22 at 23, said member 22 being supported at its rear end upon the axle 8, and carrying a seat 24 upon a spring plate 25 for the driver, and said sway-bar 21 has the tongue 26 pivoted thereto, at 27, in such manner as to permit the vertical movement thereof on its pivot, the sway-bar also carrying the double-tree 28 pivoted thereto at 29 when the device is adapted to be drawn by a team of horses.

Also pivoted on the central frame member 22 is a bar 30 the ends of which are connected with the arms 17 by means of rods 31, said bar 30 having a right pedal 32 and a left pedal 33, one on each side of the pivot 34, and pressure on either one of which rotates the swivel 15 in the head 14 and thus guides the machine, said pedals being in operative proximity to the driver's seat 24, and I also provide a marker 35 at the ends of rods 36 and 37 pivoted in eye-bolts 38 and 39 mounted on the frame member 22 and the slotted member 20, respectively, and I also provide a yoke 40 in the sway-bar 21 and the arms of which are adapted to engage the outer sides of the main frame members 12 and 13 in order to lock the sway-bar to the frame when the direction of movement is straight ahead, said yoke, when moved into the dotted position indicated in Fig. 2, permitting free movement of the sway-bar.

Rotatable in suitable hangers on the main frame members 12 and 13 is a transverse shaft 41 carrying a set of inclined, downwardly directed, arms 42 in pivoted connection with corresponding links 43 carrying a shaft 44 at their lower ends, said shaft being connected with the draw-bar 19 by means of suitable straps 45 freely revoluble on said draw-bar, and the shaft 44 is freely rotatable in its links and in its straps, and I provide brace rods 46, Fig. 1, for the said draw-bar.

The shaft 41 has a hand-lever 47 secured thereto in operative adjustable connection with a toothed segment 48 in the usual or any desired manner, the lever movement in a backward direction raising the arms 42 and thereby raising the shaft 44, the straps 45 permitting this movement, and the parts on the shaft 44, to be described, are thus raised into inoperative position, clear of the ground, as a unit, and locked in such position by means of the segment 48.

To the rear of the shaft 41 is a rotatable shaft 49, shown in detail in Fig. 3, arranged in suitable hangers 50 on the frame members 12 and 13, said shaft 49 having an arm 51 secured thereto and a collar 52 carrying a pedal 53 whereby said shaft may be rotated and said arm correspondingly moved, and the shaft 49 also carries a plurality of sleeves 54 and 55 revoluble thereon, and sleeves 56 and 57 revoluble on said first named sleeves, said sleeves carrying pedals 58, 59, 60 and 61, respectively, and arms 62, 63, 64 and 65, respectively, in all respects similar to the arm 51, and it will be seen that, if any of the pedals be moved, the corresponding arms are moved accordingly.

In pivotal connection with the draw-bar 19 are a plurality of rearwardly directed bars 66, 67, 68, 69 and 70, adjustable on said draw-bar, and each of which carries a plow at its rear end, as shown at 71, 72, 73, 74 and 75, respectively, in Fig. 1, a link 76, 77, 78, 79 and 80 connecting the corresponding plows and arms 51, 62, 63, 64 and 65, and each of said arms, as well as each of the pedals 53, 58, 59, 60 and 61 is adjustable on the corresponding shaft 49 and sleeves 54, 55, 56 and 57, whereby said arms and pedals may be adjusted to conform to the adjusted positions of the said plows, and I also provide chains 81 for connecting the individual arms 51, 62, 63, 64 and 65, with corresponding arms 42, an equal number of each of said arms being provided, said chains insuring complemental movement of all of the said individual arms with the arms 42, whereby said plows are all raised or lowered by the movement of the lever 47, but individual plow movement is possible by means of the individual pedals, and said chains also serve to prevent backward buckling of the arms and links connected with said plows, at their knuckle joints.

Arranged on the shaft 44 and revoluble therewith are a plurality of cutting units 82, 83, 84, 85, 86, 87, 88, 89, 90 and 91, in pairs, one unit of each pair being on each side of a corresponding plow 71, 72, 73, 74 and 75, and each of said units consists, as shown in detail in Fig. 4, of two collars 92 locked on the said shaft, two disks 93 therebetween, and two circular plates 94 and 95 locked therebetween, the former of which is a disk cutter, of planetary form, toothed upon its periphery if desired, and the latter of which is provided with relatively large, inclined, teeth 96, whereby the cutter so formed is of substantially convexo-concave shape, all of said units being exactly alike but, when arranged on the shaft 44, the concave faces of the units of each pair face outwardly, whereby a plane surface is assured on the contiguous faces of the planetary cutters 94, and between which the plants desired to be preserved pass in the movement of the device over a field, the concaved cutters and the plows within the pairs thereof acting to remove all plants, weeds, or other vegetation between the planetary cutters, and thus between the plants intended to be preserved.

In the operation of the device, the driver may guide the same at will, the sway-bar permitting close approach to a fence, or other inclosure, as well as to rocks and stumps if any such exist in the field, and, in the event of the plants which it is desired to save not being in symmetrical transverse rows, he may raise all of the cutters and plows out of operative position, or he may raise any one of the plows individually without disturbing the cutters on the shaft 44.

As shown in Figs. 1, 2 and 5, I have shown a driver's seat 24ª whereby the operator of the machine has his hands and feet free to manipulate the levers 53ª, 58ª, 59ª, 60ª, and 61ª, or the complemental pedals 53, 58, 59, 60, and 61.

It will thus be seen that I provide a machine adapted for transverse and longitudinal elimination of undesired vegetation between desired plants, and whereby the remaining plants are arranged in parallel rows longitudinally and transversely of a field; the device is under the control of the operator as to what vegetation he desires to eliminate or to save; the device may be propelled or moved in any desired manner and the sway-bar may be locked in position so the horses can guide the machine when moving from one field to another.

While I have shown a present preferred form of construction for putting the invention into practice, I do not desire to limit myself to any specific form, but may make changes therein and modifications thereover, within the scope of the following claims, without departing from the spirit of my invention or sacrificing its advantages.

Having fully described the invention, what I claim as new and desire to secure by Letters Patent, is:—

1. A device of the class described, comprising a frame, wheels thereunder, a seat on said frame, a gang of plows, a shaft, a plurality of cutter units on said shaft, a guide-wheel, means for actuating said guide-wheel, means for raising said plows and cutters simultaneously, and means for raising each of said plows individually, all of said actuating means being adjacent said seat.

2. A device of the class described, comprising a frame, wheels thereunder, means for guiding the same, a draw-bar, a shaft, a plurality of straps connecting said draw-bar and shaft, a plurality of cutting units on said shaft, a plurality of plows drawn by said bar, and means for actuating said cutting units and said plows into and out of operative positions, jointly, or separately.

3. A device of the class described, comprising a frame, wheels thereunder, a seat on said frame, a gang of plows, a shaft, a plurality of cutter units on said shaft, means for raising said cutters, means connecting said cutter raising means with said plows whereby the latter are raised in the raising of the former, and means for raising each of said plows individually, all of said actuating means being adjacent said seat.

4. A device of the class described, comprising a frame, wheels thereunder, a seat thereon, a gang of plows, a plurality of telescoped elements in operative connection with the respective plows, a pedal on each of said elements whereby any one of said plows may be raised individually, a shaft, a plurality of cutter units thereon, and means for raising said cutters and plows simultaneously.

5. A device of the class described, comprising a frame, wheels thereunder, means for guiding the same, a draw-bar, a shaft, a plurality of straps connecting said draw-bar and shaft pivotally, a plurality of cutting units on said shaft, a plurality of plows drawn by said bar, a supplemental shaft, a plurality of arms carried thereby, links connecting the respective arms with said first named shaft, and means for rocking said supplemental shaft to raise said cutter units and said plows simultaneously.

In testimony whereof I have signed my name to this specification in the presence of the subscribing witnesses.

JOSEPH LEWIS JENSEN.

Witnesses:
JAMES C. ANDERSON,
HENRY ANDERSON.

Copies of this patent may be obtained for five cents each, by addressing the "Commissioner of Patents, Washington, D. C."